(12) United States Patent
Casebeer, II

(10) Patent No.: US 11,789,474 B2
(45) Date of Patent: Oct. 17, 2023

(54) PRESSURE GAUGE WITH AUTOMATIC BLEED VALVE

(71) Applicant: Motool LLC, Murrieta, CA (US)

(72) Inventor: John Charles Casebeer, II, Murrieta, CA (US)

(73) Assignee: Motool LLC, Murrieta, CA (US)

(*) Notice: Subject to any disclaimer, the term of this patent is extended or adjusted under 35 U.S.C. 154(b) by 0 days.

(21) Appl. No.: 17/542,601

(22) Filed: Dec. 6, 2021

(65) Prior Publication Data
US 2023/0176597 A1   Jun. 8, 2023

(51) Int. Cl.
*G05D 16/20* (2006.01)

(52) U.S. Cl.
CPC ....... *G05D 16/2013* (2013.01); *G05D 16/202* (2013.01); *G05D 16/2024* (2019.01); *Y10T 137/264* (2015.04); *Y10T 137/2605* (2015.04); *Y10T 137/2622* (2015.04)

(58) Field of Classification Search
CPC ............. G05D 16/2013; G05D 16/202; G05D 16/2022; G05D 16/2024; Y10T 137/2605; Y10T 137/2612; Y10T 137/2622; Y10T 137/264
USPC .............. 137/115.13, 115.14, 115.18, 115.25
See application file for complete search history.

(56) References Cited

U.S. PATENT DOCUMENTS

| 4,019,552 A | 4/1977 | Tsuruta | |
| 4,394,871 A * | 7/1983 | Czajka | G05D 16/2053 137/624.11 |
| 4,431,043 A | 2/1984 | Goodell et al. | |
| 4,617,952 A * | 10/1986 | Fujiwara | F15B 5/003 137/625.45 |
| 4,777,383 A * | 10/1988 | Waller | G05D 16/2053 700/282 |
| 4,791,954 A * | 12/1988 | Hasegawa | G05D 16/202 137/489.5 |
| 5,207,737 A * | 5/1993 | Hanley | G05D 16/2024 137/102 |
| 5,556,489 A | 9/1996 | Curlett et al. | |
| 5,860,442 A * | 1/1999 | Taylor | F16K 17/406 137/115.18 |
| 6,022,483 A * | 2/2000 | Aral | G05D 16/202 156/345.29 |
| 8,387,753 B2 | 3/2013 | Petrucelli | |
| 9,021,872 B2 | 5/2015 | Casebeer, II | |
| 9,296,263 B2 | 3/2016 | Muthukumar | |

(Continued)

*Primary Examiner* — William M McCalister
(74) *Attorney, Agent, or Firm* — Woods Oviatt Gilman LLP; Dennis B. Danella, Esq.

(57) ABSTRACT

A pressure gauge includes a housing defining a fluid path and a bleed path. An inlet is mounted on the housing and a pressure sensor is disposed within the housing. A bleed valve is disposed along the fluid path and selectively opens or closes the bleed path. An actuator moves the bleed valve between a closed position and an open position. A control module is coupled to the pressure sensor and the actuator and includes a memory and a processor. A target fluid pressure is stored in the memory and the processor receives pressure data from the pressure sensor. When the pressure data is greater than the target fluid pressure, the processor controls the actuator to place the bleed valve in the open position. When the pressure data is equal to the target fluid pressure, the processor controls the actuator to place the bleed valve in the closed position.

16 Claims, 3 Drawing Sheets

(56) References Cited

U.S. PATENT DOCUMENTS

| | | |
|---|---|---|
| 9,308,786 B2 | 4/2016 | Stoychev et al. |
| 9,446,637 B2 | 9/2016 | Knapke et al. |
| 10,137,746 B2 | 11/2018 | Tiziani et al. |
| 2004/0016465 A1* | 1/2004 | Wingert ............ G05D 16/2013 137/625.65 |
| 2005/0123408 A1* | 6/2005 | Koehl .................... F04D 15/02 417/53 |
| 2014/0048255 A1* | 2/2014 | Baca ....................... E21B 34/02 166/250.1 |
| 2014/0183893 A1* | 7/2014 | Scarbrough ............ B60P 3/341 296/10 |
| 2014/0271261 A1 | 9/2014 | Boelryk |
| 2016/0121667 A1 | 5/2016 | Benedict |
| 2016/0377192 A1* | 12/2016 | Renollett ........... G05D 16/2093 251/30.01 |
| 2016/0378101 A1* | 12/2016 | Leonard ............ G05D 16/2013 700/11 |
| 2018/0186197 A1 | 7/2018 | Tsiberidou et al. |
| 2020/0348705 A1* | 11/2020 | Deivasigamani .. G05B 23/0235 |
| 2021/0101420 A1 | 4/2021 | Finkle et al. |
| 2021/0223801 A1* | 7/2021 | Lawson ................ G01L 19/086 |

* cited by examiner

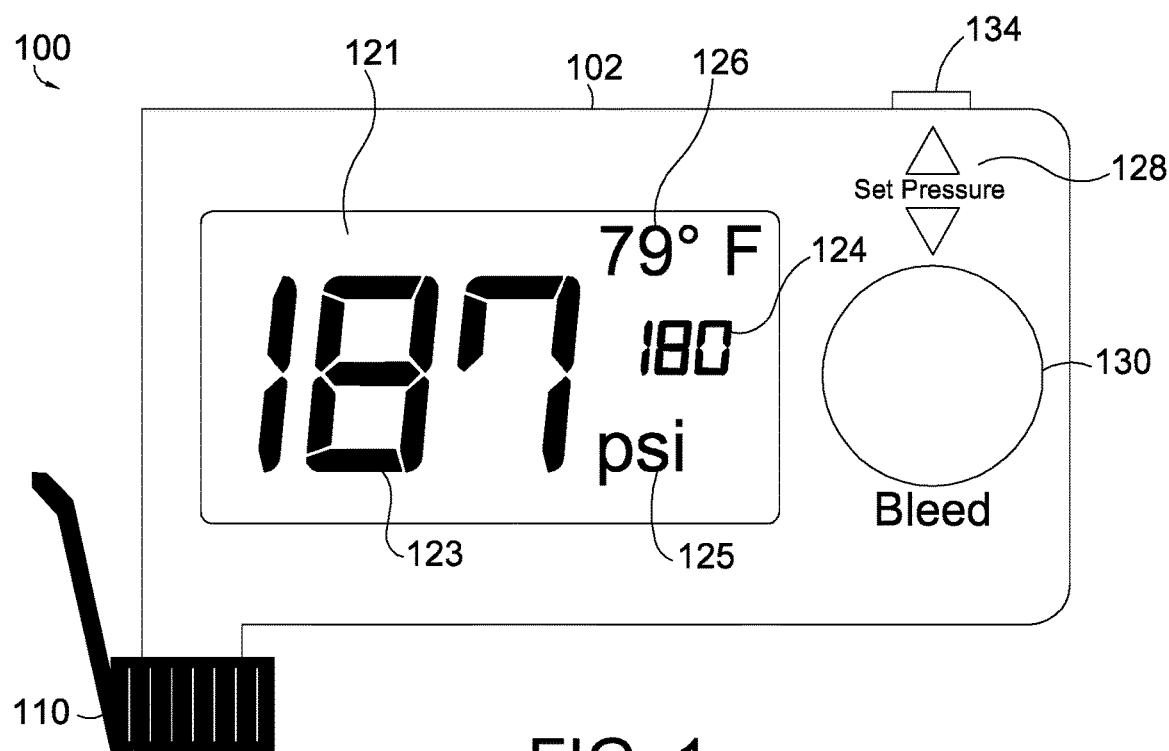
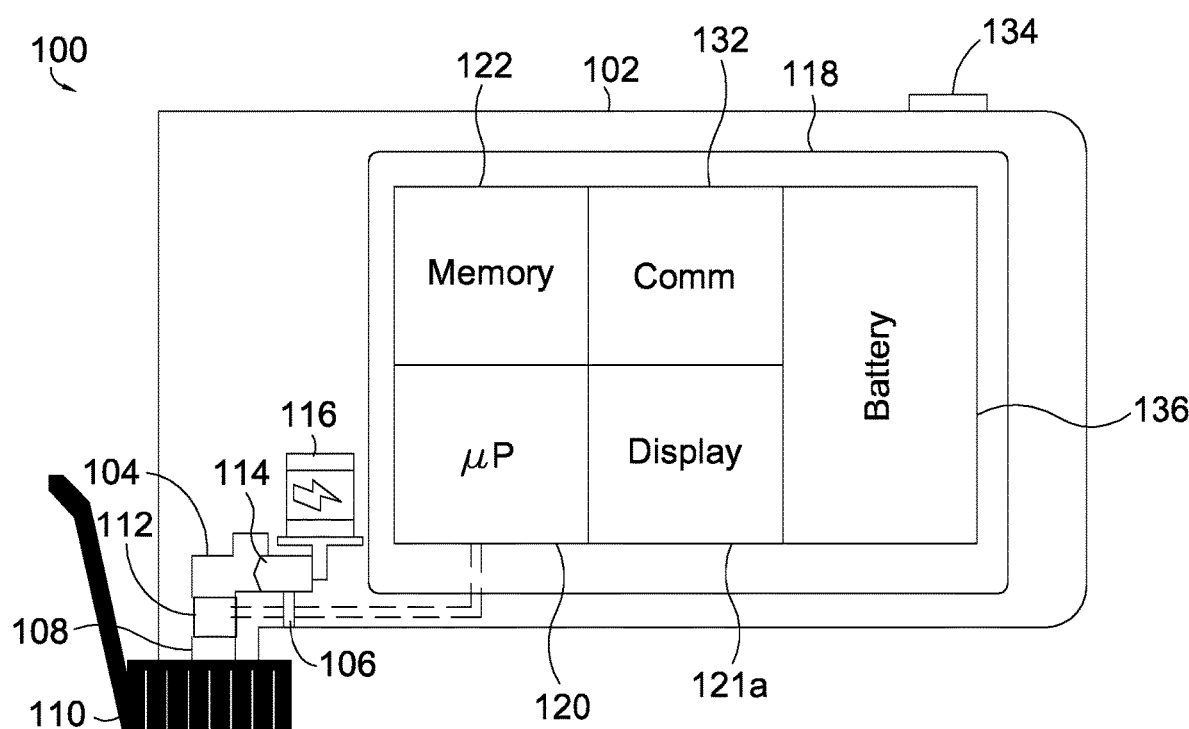

PRESSURE GAUGE WITH AUTOMATIC BLEED VALVE

FIELD OF THE INVENTION

This invention relates generally to pressure gauges and, more particularly, to a pressure gauge with an automatic bleed valve, and still more particularly, to a pressure gauge that allows a user to preselect a desired vessel pressure whereby the automatic bleed valve relieves vessel overpressure until the preselected pressure is reached before automatic reclosing of the bleed valve.

BACKGROUND OF THE INVENTION

The attitude of a vehicle, such as a mountain bike or dirt bike, with a rider mounted effects steering and the way the bike handles over bumps. Front and rear air shocks are generally provided to adjust vehicle attitude and reduce wear and tear on the vehicle, as well to provide for user comfort. The attitude of the bike effects steering and handling while the position of the shock's stroke primarily effects handling. Since there are internal springs in the shocks, compressing the shock further into the shock stroke will provide a stiffer ride. Most commercially available shocks, such as those used with mountain bikes, recommend setting the stroke with the rider mounted at 25%-35% of the total stroke.

Typically, a rider manually adjusts the pressure setting of each shock by pumping, such as via a hand pump, the shock to an initial pressure. This pressure may be slightly greater than the recommended pressure range stipulated by the shock manufacturer. The rider may then perform a test ride to determine whether the pressure is set at the desired level. Should the pressure be too high, the user may then successively bleed pressure from the shock and perform further test rides until the optimal pressure is achieved. Each time, the rider must dismount from the bike, check and adjust the shock pressure, remount the bike and perform a test ride. This sequence is then repeated for each of the remaining shocks. Thus, the process to properly set the bike's suspension is laborious, and may become tedious, leading riders to settle for non-optimal and possibly dangerous bike set ups which may lead to bike damage and/or rider injury.

Therefore, there is need to be able to quickly adjust suspension sag (front and rear shock stroke on a bike) while the rider is mounted on the bike. The particular setting may be based upon a setting selected specifically by the rider or to specifications given in a look-up table based upon the bike manufacturer, anticipated terrain, rider weight, etc. The present invention satisfies these, as well as other, needs.

BRIEF SUMMARY OF THE INVENTION

In accordance with an aspect of the present invention, the present invention may be directed to a pressure gauge configured for setting a target fluid pressure within a vessel. The pressure gauge comprises a housing defining a fluid path and a bleed path. An inlet is mounted on the housing in communication with a first end of the fluid path, wherein a first measured fluid pressure within the fluid path equals the target fluid pressure and a second measured fluid pressure within the fluid path is greater than the first measured fluid pressure. A pressure sensor is disposed within the housing and configured to measure the first and second fluid pressures within the fluid path. A bleed valve is disposed along the fluid path and is configured to selectively open or close the bleed path. An actuator is coupled to the bleed valve and is operable to move the bleed valve between a first position wherein the bleed path is open and a second position wherein the bleed path is closed. A control module is disposed within the housing and is communicatively coupled to the pressure sensor and the actuator. The control module includes a memory and a processor, wherein the target fluid pressure is stored in the memory and wherein the processor is configured to receive pressure data from the pressure sensor. When the pressure data is at the second measured fluid pressure, the processor controls the actuator to place the bleed valve in the first position to reduce the second measured fluid pressure, and when the reduced second measured fluid pressure equals the first measured fluid pressure, the processor controls the actuator to place the bleed valve in the second position.

In accordance with a further aspect of the present invention, the control module further includes a display in communication with the processor. The display is configured to show the pressure of the fluid in the fluid path and the target fluid pressure. The control module may further include a first user input wherein a user manually selects the target fluid pressure. The control module may further include a second user input wherein a user manually controls the actuator to place the bleed valve in the second position when the pressure data is above the target fluid pressure.

In accordance with another aspect, the control module includes a communication module configured for wireless connectivity to a network. The communication module may be configured for Bluetooth connectivity. The actuator may be a servomotor and the inlet may include a fitting configured to releasably couple to a SCHRADER® valve or a Presta valve.

In accordance with another aspect, the present invention may be directed to a method for bleeding a fluid from an over-pressurized vessel. The method comprises coupling a pressure gauge to a fluid port of the vessel. The pressure gauge includes a housing defining a fluid path and a bleed path; an inlet mounted on the housing in communication with the fluid path, wherein the inlet is configured to fluidly couple to the fluid port; a pressure sensor disposed within the housing and configured to measure a pressure of a fluid within the fluid path; a bleed valve disposed along the fluid path and configured to selectively open or close the bleed path; an actuator coupled to the bleed valve and operable to move the bleed valve between a first position wherein the bleed path is closed and a second position wherein the bleed path is open; and a control module disposed within the housing and communicatively coupled to the pressure sensor and the actuator, wherein the control module includes a memory and a processor, wherein a target fluid pressure is stored in the memory, and wherein the processor is configured to receive pressure data from the pressure sensor. The method further comprises inputting and storing the target fluid pressure in the memory of the control module; controlling the actuator, via the processer, to place the bleed valve in the second position when the pressure data is above the target fluid pressure; and controlling the actuator, via the processer, to place the bleed valve in the first position when the pressure data reaches the target fluid pressure.

In accordance with still another aspect, the present invention may be directed to a method to adjust suspension sag of a vehicle equipped with one or more shocks. The method comprises coupling a pressure gauge to a fluid port of at least one shock. The pressure gauge includes a housing defining a fluid path and a bleed path; an inlet mounted on the housing in communication with the fluid path, wherein the inlet is configured to fluidly couple to the fluid port; a pressure sensor disposed within the housing and configured to measure a pressure of a fluid within the fluid path; a bleed valve disposed along the fluid path and configured to selectively open or close the bleed path; an actuator coupled to the bleed valve and operable to move the bleed valve between a first position wherein the bleed path is closed and a second position wherein the bleed path is open; and a control module disposed within the housing and communicatively coupled to the pressure sensor and the actuator, wherein the control module includes a memory and a processor, wherein a target fluid pressure is stored in the memory and wherein the processor is configured to receive pressure data from the pressure sensor. The method further comprises inputting and storing the target fluid pressure in the memory of the control module; placing a load on the vehicle; controlling the actuator, via the processer, to place the bleed valve in the second position when the pressure data is above the target fluid pressure; and controlling the actuator, via the processer, to place the bleed valve in the first position when the pressure data reaches the target fluid pressure. The target fluid pressure may be selected using a look-up table.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

The accompanying drawings form a part of this specification and are to be read in conjunction therewith, wherein like reference numerals are employed to indicate like parts in the various views, and wherein:

FIG. 1 is a front plan view of an exemplary embodiment of a pressure gauge in accordance with the present invention;

FIG. 2 is an internal plan view of the exemplary pressure gauge shown in FIG. 1;

DETAILED DESCRIPTION OF THE INVENTION

Figure 3:
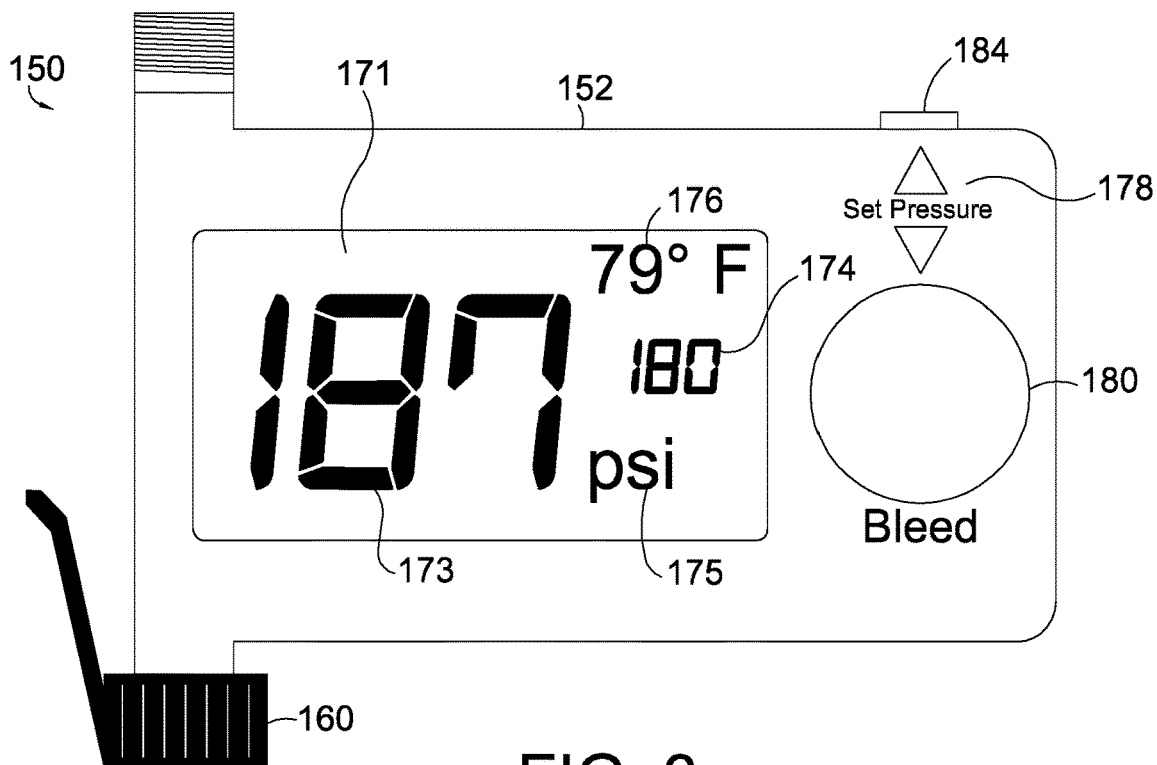
FIG. 3 is a front plan view of an alternative exemplary embodiment of a pressure gauge in accordance with the present invention.

With reference to FIGS. 1 and 2, an exemplary embodiment of a pressure gauge 100 is shown. Pressure gauge 100 includes a housing 102 defining a fluid path 104 and a bleed path 106. An inlet 108 is mounted onto housing 102 and may include a fitting 110 configured to matingly couple pressure gauge 100 with a fluid port of a vessel (not shown). In one non-limiting example, fitting 110 may be configured to couple with a SCHRADER® valve or Presta valve, such as those used with automobile tires or bicycle tire tubes. A pressure sensor 112 is disposed within housing 102 along fluid path 104 and is configured to measure the pressure of a fluid within fluid path 104, and therefore within the vessel, when pressure gauge 100 is mounted onto the vessel's fluid port. Continuing the above non-limiting example, pressure sensor 112 may measure the air pressure within the tire/tube. A bleed valve 114 may be disposed along fluid path 104 downstream pressure sensor 112. Bleed valve 114 may be selectively alternated between a first position where bleed path 106 is closed and a second position where bleed path 106 is open. When open, bleed path 106 allows fluid to bleed or escape from housing 102 and the vessel to reduce the fluid pressure of the fluid within the vessel.

In accordance with an embodiment of the invention, bleed valve 114 may be operably coupled to an actuator 116. By way of example and without limitation thereto, actuator 116 may be a servomotor. Powering of servomotor 116 selectively actuates bleed valve 114 between the first and second positions. Servomotor 116 control may be managed by a control module 118 disposed within housing 102. As seen in FIG. 2, control module 118 may generally comprise a microprocessor 120 and memory 122. Memory 122 may be populated with a target fluid pressure setting. Microprocessor 120 is configured to receive pressure data from pressure sensor 112 when pressure gauge 100 is mounted onto the vessel as described above. Microprocessor 120 may then interrogate the pressure data to determine if the fluid pressure within the vessel is greater than or less than the target fluid pressure stored in memory 122.

When the pressure data is at or below the target fluid pressure, microprocessor 120 controls actuator 116 to place bleed valve 114 in the first position whereby bleed path 106 is closed. When the pressure data is above the target fluid pressure, microprocessor 120 may control actuator 116 to place bleed valve 114 in the second position whereby bleed path 106 is opened and excess pressure (pressure above the target fluid pressure) may be released from housing 102 and the vessel through open bleed path 106. Once the fluid pressure in the vessel reaches the target fluid pressure, microprocessor 120 controls actuator 116 to return bleed valve 114 to the first position and thereby close bleed path 106 and prevent further bleeding of the pressure. In this manner, the vessel may be initially over-pressurized and then subsequently vented by simply mounting pressure gauge 100 to the vessel. The user needs to no longer perform repeated bleeds while estimating or guessing the amount of pressure being manually released from the vessel each time before the target fluid pressure is achieved.

As further shown in FIGS. 1 and 2, housing 102 may further include a display 121 communicatively coupled to control module 118, such as via display bus 121a. Display 121 may visually output data, such as the sensed pressure 123 within fluid path 104 and the target fluid pressure 124, including pressure units 125. Additional data displayed may include the ambient temperature 126, such as may be measured by a thermocouple (not shown) on housing 102. Housing 102 may also include a first set of user inputs 128 which may take the form of buttons or other suitable input actuators such that the user may manually set the desired target fluid pressure to be stored within memory 122. A second user input 130 may also be included to allow the user to manually control actuator 116 to place bleed valve 114 in the second position when the pressure data is above the target fluid pressure. Control module 118 may also include a communication module 132 configured for wirelessly connectivity of pressure gauge 100 with a network, such as but not limited to Bluetooth. Power/select button 134 controls powering of control module 118 via a battery 136 and may toggle pressure unit output 125 as desired.

Figure 4:
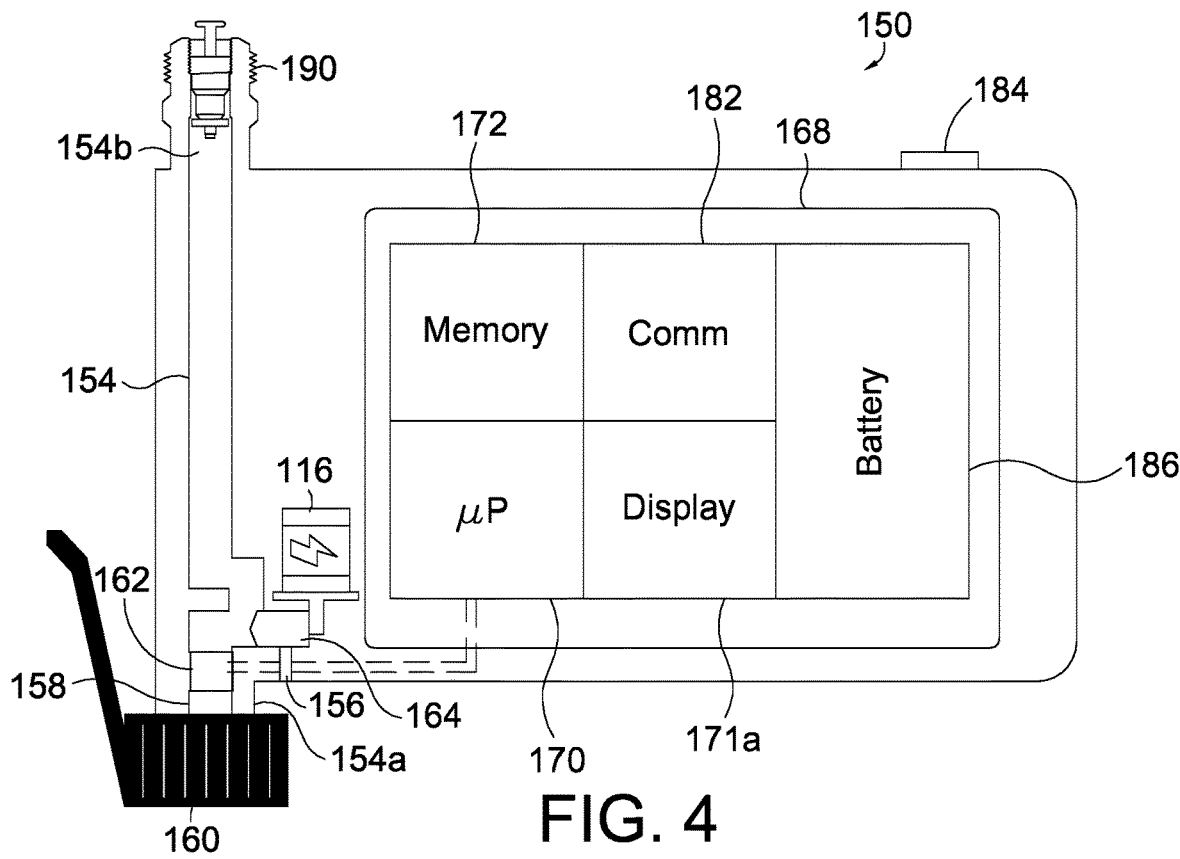
FIG. 4 is an internal plan view of the exemplary pressure gauge shown in FIG. 3.

An alternative exemplary embodiment of a pressure gauge 150 is shown in FIGS. 3 and 4. Similar to pressure gauge 100 described above with regard to FIGS. 1 and 2, pressure gauge 150 includes a housing 152 defining a fluid path 154 and a bleed path 156. An inlet 158 is mounted onto housing 152 in communication with a first end 154a of fluid path 154. Inlet 158 may include a fitting 160 configured to matingly couple with a fluid port of a vessel. In one non-limiting example, fitting 160 may be configured to couple with a SCHRADER® valve or Presta valve, such as those used with automobile tires or bicycle tire tubes. Fluid path 154 differs from fluid path 104 by extending across the entire width of housing 152 and terminating at second end 154b. Second end 154b includes an inlet valve 190 which may comprise a SCHRADER® valve or Presta valve that is configured to couple with a high pressure fluid source, such as a hand/foot pump or compressor. Pressure gauge 150 may then be positioned inline between the high pressure fluid source and the vessel when pressurizing the vessel.

Pressure gauge 150 may include a pressure sensor 162 disposed within housing 152 along fluid path 154. Pressure sensor 162 is configured to measure the pressure of fluid within fluid path 154, and therefore within the vessel, when pressure gauge 150 is mounted onto the vessel's fluid port. By way of example, pressure sensor 162 may measure the air pressure within the tire/tube. A bleed valve 164 may be disposed along fluid path 154 between pressure sensor 162 and second end 154b of flow path 154. Bleed valve 164 may be selectively alternated between a first position where bleed path 156 is closed and a second position where bleed path 156 is open to thereby allow fluid to bleed or escape from housing 152 and the vessel.

As with pressure gauge 100, pressure gauge 150 may include a bleed valve 164 operably coupled to an actuator 166. By way of example and without limitation thereto, actuator 116 may be a servomotor. Powering of servomotor 166 selectively actuates bleed valve 164 between the first and second positions. Servomotor 166 control may be managed by a control module 168 disposed within housing 152. As seen in FIG. 4, control module 168 may generally comprise a microprocessor 170 and memory 172. Memory 172 may be populated with a target fluid pressure setting. Microprocessor 170 is configured to receive pressure data from pressure sensor 162 when pressure gauge 150 is mounted onto the vessel as described above. Microprocessor 170 may then interrogate the pressure data to determine if the fluid pressure within the vessel is greater than or less than the target fluid pressure stored in memory 172.

When the pressure data is at or below the target fluid pressure, microprocessor 170 controls actuator 166 to place bleed valve 164 in the first position whereby bleed path 156 is closed. When the pressure data is above the target fluid pressure, microprocessor 170 may control actuator 166 to place bleed valve 164 in the second position whereby bleed path 156 is opened and excess pressure (pressure above the target fluid pressure) may be released from housing 152 and the vessel through open bleed path 156. Once the fluid pressure in the vessel reaches the target fluid pressure, microprocessor 170 controls actuator 166 to return bleed valve 164 to the first position and thereby close bleed path 156 and prevent further bleeding of the pressure. In this manner, the vessel may be over-pressurized via inlet valve 190 and then subsequently vented by closing inlet valve 190 and opening bleed path 156. The user needs to no longer perform repeated bleeds while estimating or guessing the amount of pressure being manually released from the vessel each time before the target fluid pressure is achieved.

As further shown in FIGS. 3 and 4, housing 152 may further include a display 171 communicatively coupled to control module 168, such as via display bus 171a. Display 171 may visually output data, such as the sensed pressure 173 within fluid path 154 and the target fluid pressure 174, including pressure units 175. Additional data displayed may include the ambient temperature 176, such as may be measured by a thermocouple (not shown) coupled to housing 152. Housing 152 may also include a first set of user inputs 178 which may take the form of buttons or other suitable input actuators such that the user may manually set the desired target fluid pressure to be stored within memory 172. A second user input 180 may also be included to allow the user to manually control actuator 166 to place bleed valve 164 in the second position when the pressure data is above the target fluid pressure. Control module 168 may also include a communication module 182 configured for wirelessly connectivity of pressure gauge 150 with a network, such as but not limited to Bluetooth. Power/select button 184 controls powering of control module 168 via a battery 186 and may toggle pressure unit output 175 as desired.

It should be noted that while the above discussion of pressure gauges 100, 150 was directed toward a control module including a distinct microprocessor, memory and peripheral devices, it is envisioned that the control module may be configured as a microcontroller combining each of these elements into a single unit.

In an exemplary, non-limiting practical application, a method for bleeding a fluid from an over-pressurized vessel may include coupling a pressure gauge 100, 150 to a fluid port of a vessel. Again, the vessel may be an automobile or bicycle tire and include a SCHRADER® or Presta valve port. A target fluid pressure 124, 174 may be input and stored within the memory 122, 172 of the control module 118, 168 of pressure gauge 100, 150. With the tire pressure gauge 100, 150 mounted onto the fluid port of the over-pressurized vessel, the processor 120, 170 of the control module 118, 168 controls actuator 116, 166 to move bleed valve 114, 164 to the second position whereby bleed path 106, 156 is opened to allow the over-pressurized fluid to bleed from the vessel through housing 102, 152 until the target fluid pressure is reached. The processor 120, 170 may then control actuator 116, 166 to return bleed valve 114, 164 to the first position whereby bleed path 106, 156 is closed and fluid is no longer being bled from the vessel.

Figure 5:
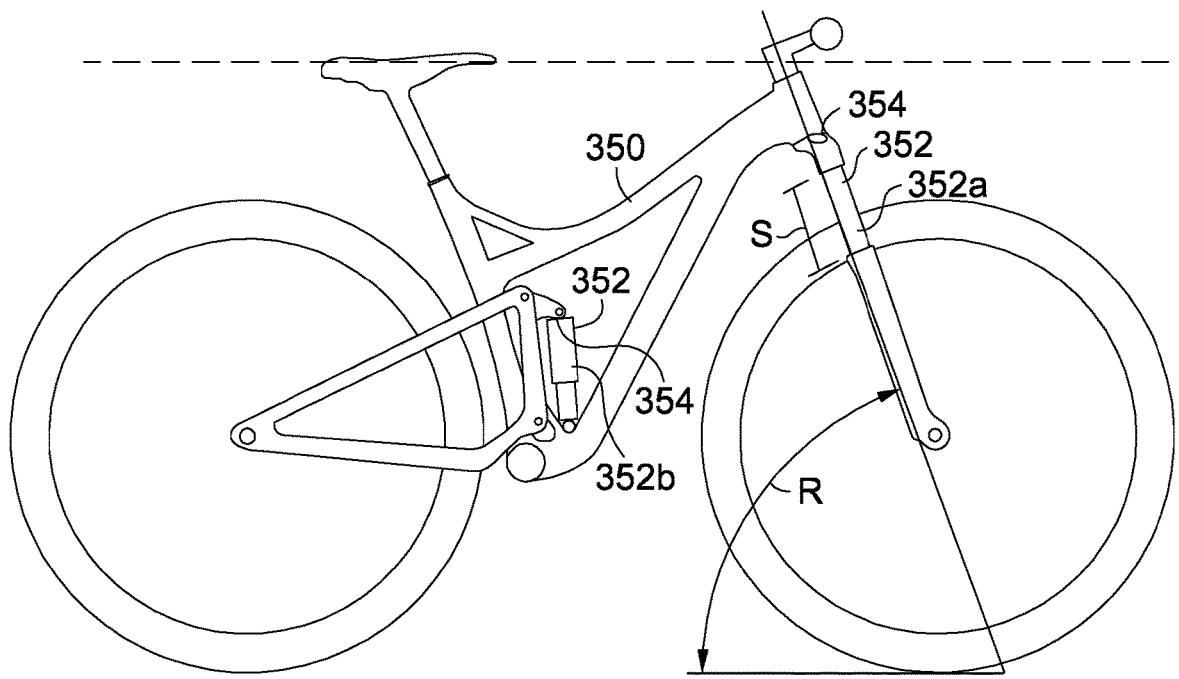
FIG. 5 is a side plan view of a mountain bike including one or more shocks which may be used to adjust the suspension sag of the bike using an exemplary embodiment of a pressure gauge shown in FIGS. 1-4, with the mountain bike in an unloaded condition.
Figure 6:
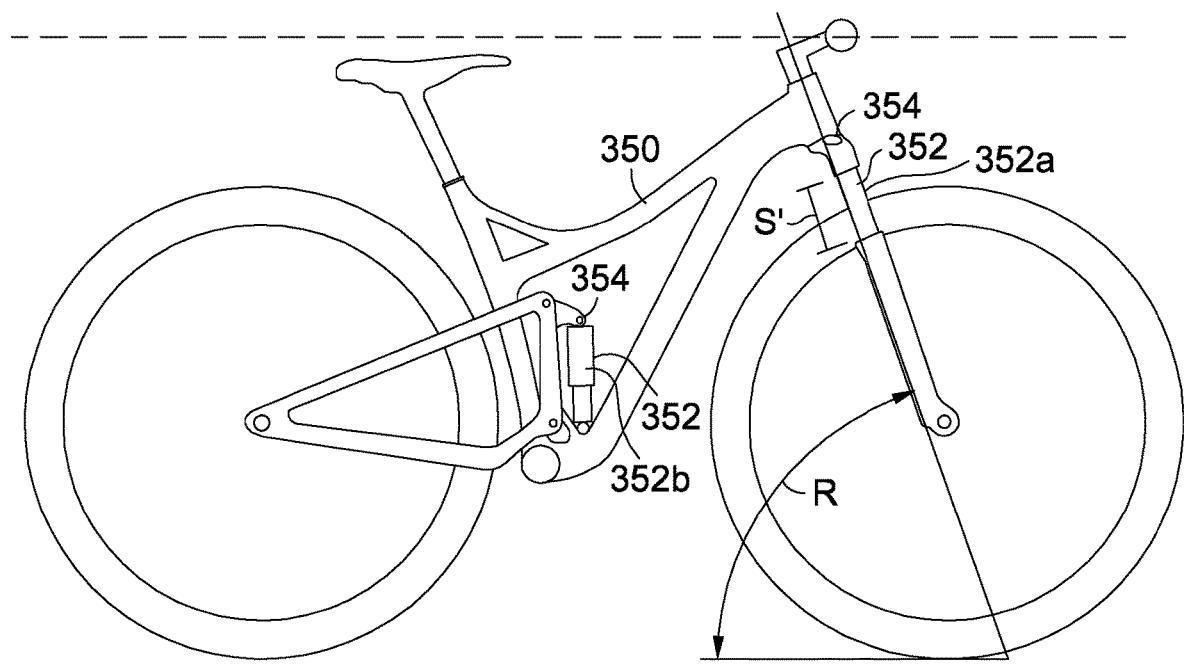
FIG. 6 is a side plan view of the mountain bike shown in FIG. 5, with the mountain bike in a loaded condition.

With additional reference to FIGS. 5 and 6, another exemplary, non-limiting practical application of the present invention includes a method for adjusting suspension sag of a vehicle, such as a mountain bike 350, equipped with one or more shocks 352. It should be noted that while shown and described with regard to a pneumatic shocks used on a mountain bike, the method may be used with any suitable pressurized system, such as but not limited to hydraulic or pneumatic systems including tires, reverse osmosis tanks and the like.

The attitude of bike 350 without a mounted rider is shown in FIG. 5. Front and rear air shocks 352a, 352b, respectively, are equipped on bike 350 and may be intentionally initially over-pressurized, that is at a pressure greater than the desired final pressure. As can be seen in FIGS. 5 and 6, the suspension (shocks 352a, 352b) should compress relative to one another to result in the same fork rake angle R when the bike is unloaded (FIG. 5) and when loaded or a rider is mounted (FIG. 6). The fork rake angle R directly affects the way the bike steers and handles and the sag (shock travel) affects where the suspension sits in the stroke of the shocks 352, 352b. Since there is an internal spring in each shock, compressing each shock further into its shock stroke will provide a stiffer ride. Most shock manufacturers recommend setting up the shock to have a stroke travel, or sag value (SV), with the rider mounted of between about 25%-35% of the total possible stroke length (S). See FIGS. 5 and 6 where SV=(S-S')/S. The actual sag value is subjective and will vary from rider to rider and may also be adjusted to accommodate different terrains and other riding conditions. More advanced riders may fine tune their bikes to have specific shock pressures based upon rider experience/preference while others may adjust shock pressures (and thus suspension sag) based upon specifications given in a look-up table based upon any number of variables, including the bike manufacturer, anticipated terrain, rider weight, and the like.

To adjust suspension sag, a pressure gauge 100, 150 is coupled to a fluid port, such as a SCHRADER® valve or Presta valve 354, of at least one shock 352. The at least one shock 352 is over-pressurized relative to target fluid pressure 124, 174 which may be input and stored within the memory 122, 172 of the control module 118, 168 of pressure gauge 100, 150. A load is placed on the vehicle, such a rider mounting the bike 350, and the actuator 116, 166 is controlled, via the processer 120, 170 to place the bleed valve 114, 164 in the second position wherein bleed path 106, 156 is open to bleed excess pressure from the at least one shock 352 until the target fluid pressure is reached. The actuator 116, 166 is then controlled, via the processer 120, 170, to place the bleed valve 114, 164 in the first position to close bleed path 106, 156 and maintain the target fluid pressure within the at least one shock 352. In an exemplary embodiment, the target fluid pressure is selected using a look-up table as described above.

From the foregoing, it will be seen that this invention is one well adapted to attain all the ends and objects hereinabove set forth together with other advantages which are obvious and which are inherent to the method and apparatus. It will be understood that certain features and sub combinations are of utility and may be employed without reference to other features and sub combinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions described above and illustrated in the drawings are presented by way of example only and are not intended to limit the concepts and principles of the present invention. As used herein, the terms "having" and/or "including" and other terms of inclusion are terms indicative of inclusion rather than requirement.

While the invention has been described with reference to preferred embodiments, it will be understood by those skilled in the art that various changes may be made and equivalents may be substituted for elements thereof to adapt to particular situations without departing from the scope of the invention. Therefore, it is intended that the invention not be limited to the particular embodiments disclosed as the best mode contemplated for carrying out this invention, but that the invention will include all embodiments falling within the scope and spirit of the appended claims.

What is claimed is:

1. A pressure gauge configured for setting a target fluid pressure within a vessel, the pressure gauge comprising:
 a) a housing defining a fluid path and a bleed path, wherein the fluid path includes a first end and a second end;
 b) an inlet mounted on the housing and configured to be releasably coupled to a fluid port on the vessel, wherein the inlet is in communication with the first end of the fluid path;
 c) a pressure sensor disposed within the housing and configured to measure a pressure of a fluid within the fluid path, wherein the pressure includes a first fluid pressure and a second fluid pressure, wherein the first measured fluid pressure within the fluid path equals the target fluid pressure and the second measured fluid pressure within the fluid path is greater than the first measured fluid pressure;
 d) an inlet valve mounted on the housing, wherein the second end of the fluid path terminates in the inlet valve, and wherein the inlet valve is configured to be coupled with a high pressure fluid source to deliver a high pressure fluid to the vessel through the fluid path;
 e) a bleed valve disposed along the fluid path and configured to selectively move between a first position and a second position, wherein when the bleed valve is in the first position the fluid path is in fluid communication with the bleed path, and wherein when the bleed valve is in the second position the fluid path is not in fluid communication with the bleed path;
 f) an actuator coupled to the bleed valve and operable to move the bleed valve between the first position and the second position; and
 g) a control module disposed within the housing and communicatively coupled to the pressure sensor and the actuator, wherein the control module includes a memory and a processor, wherein the target fluid pressure is stored in the memory, and wherein the processor is configured to receive pressure data from the pressure sensor,
 wherein, when the pressure data is at the second measured fluid pressure, the processor controls the actuator to place the bleed valve in the first position to reduce the second measured fluid pressure, and
 wherein, when the reduced second measured fluid pressure equals the first measured fluid pressure, the processor controls the actuator to place the bleed valve in the second position.

2. The pressure gauge in accordance with claim 1 wherein the control module further includes a display in communication with the processor, and wherein the display is configured to show the pressure of the fluid in the fluid path and the target fluid pressure.

3. The pressure gauge in accordance with claim 1 wherein the control module further includes a first user input, and wherein a user manually selects the target fluid pressure using the first user input.

4. The pressure gauge in accordance with claim 1 wherein the control module further includes a second user input, wherein a user manually controls the actuator to place the bleed valve in the first position when the pressure data is above the target fluid pressure.

5. The pressure gauge in accordance with claim 1 wherein the control module further includes a communication module configured for wireless connectivity to a network.

6. The pressure gauge in accordance with claim 1 wherein the actuator is a servomotor.

7. The pressure gauge in accordance with claim 1 wherein the inlet includes a fitting configured to releasably couple to a tire tube valve.

8. A method for adjusting suspension sag of a vehicle equipped with one or more shocks, the method comprising:

a) releasably coupling a pressure gauge to a fluid port of at least one shock, wherein the pressure gauge comprises:
  i) a housing defining a fluid path and a bleed path, wherein the fluid path includes a first end and a second end;
  ii) an inlet mounted on the housing in communication with the first end of the fluid path;
  iii) a pressure sensor disposed within the housing and configured to measure a pressure of a fluid within the fluid path, wherein the pressure includes a first fluid pressure and a second fluid pressure, and wherein the first measured fluid pressure within the fluid path equals a target fluid pressure and the second measured fluid pressure within the fluid path is greater than the first measured fluid pressure;
  iv) an inlet valve mounted on the housing, wherein the second end of the fluid path terminates in the inlet valve, and wherein the inlet valve is configured to be coupled with a high pressure fluid source and deliver a high pressure fluid to the shock through the fluid path;
  v) a bleed valve disposed along the fluid path and configured to selectively move between a first position and a second position, wherein when the bleed valve is in the first position the fluid path is in fluid communication with the bleed path, and wherein when the bleed valve is in the second position the fluid path is not in fluid communication with the bleed path;
  vi) an actuator coupled to the bleed valve and operable to move the bleed valve between the first position and the second position; and
  vii) a control module disposed within the housing and communicatively coupled to the pressure sensor and the actuator, wherein the control module includes a memory and a processor, wherein the target fluid pressure is stored in the memory, and wherein the processor is configured to receive pressure data from the pressure sensor;

b) inputting the target fluid pressure in the memory of the control module;

c) delivering the high pressure fluid to the shock via the inlet valve to over-pressurize the at least one shock until the pressure of the fluid in the fluid path equals the second measured fluid pressure;

d) placing a load on the vehicle;

e) controlling the actuator, via the processer, to place the bleed valve in the second position when the pressure data is above the target fluid pressure; and f) controlling the actuator, via the processer, to place the bleed valve in the first position when the pressure data reaches the target fluid pressure.

9. The method in accordance with claim 8 wherein the target fluid pressure is selected using a look-up table.

10. The method in accordance with claim 8 wherein the pressure gauge further includes a thermocouple configured to measure ambient temperature, wherein the target fluid pressure is selected using a look-up table as a function of the ambient temperature.

11. The method in accordance with claim 8 wherein the control module further includes a display in communication with the processor, wherein the display is configured to show the pressure of the fluid in the fluid path and the target fluid pressure.

12. The method in accordance with claim 8 wherein the control module further includes a first user input, wherein a user manually selects the target fluid pressure using the first user input.

13. The method in accordance with claim 8 wherein the control module further includes a second user input, wherein a user manually controls the actuator to place the bleed valve in the first position when the pressure data is above the target fluid pressure.

14. The method in accordance with claim 8 wherein the control module further includes a communication module configured for wireless connectivity to a network.

15. The method in accordance with claim 8 wherein the actuator is a servomotor.

16. The method in accordance with claim 8 wherein the inlet includes a fitting configured to releasably couple to a tire tube valve.

\* \* \* \* \*